(12) United States Patent
Li

(10) Patent No.: US 11,488,321 B2
(45) Date of Patent: Nov. 1, 2022

(54) QUEUING RECOMMENDATION METHOD AND DEVICE, TERMINAL AND COMPUTER READABLE STORAGE MEDIUM

(71) Applicant: BOE Technology Group Co., Ltd., Beijing (CN)

(72) Inventor: Yue Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/257,881

(22) PCT Filed: Dec. 17, 2019

(86) PCT No.: PCT/CN2019/126104
§ 371 (c)(1),
(2) Date: Jan. 5, 2021

(87) PCT Pub. No.: WO2020/140749
PCT Pub. Date: Jul. 9, 2020

(65) Prior Publication Data
US 2021/0272314 A1    Sep. 2, 2021

(30) Foreign Application Priority Data

Jan. 2, 2019   (CN) .......................... 201910000579.4

(51) Int. Cl.
*G06T 7/73* (2017.01)
*G06T 7/187* (2017.01)
(Continued)

(52) U.S. Cl.
CPC ................ *G06T 7/73* (2017.01); *G06T 7/136* (2017.01); *G06T 7/187* (2017.01); *G06V 10/457* (2022.01);
(Continued)

(58) Field of Classification Search
CPC .. G06K 2209/21; G06K 9/00; G06K 9/00369; G06K 9/4638;
(Continued)

(56) References Cited

U.S. PATENT DOCUMENTS 5,953,055 A    9/1999  Huang et al.
2008/0312871 A1  12/2008  Salcedo
(Continued)

FOREIGN PATENT DOCUMENTS

CN    101107637 A    1/2008
CN    103942773 A    7/2014
(Continued)

OTHER PUBLICATIONS

A new Algorithm for Controlling the Mean Queue Length in a Buffer with Time Varying Arrival Rate (Year: 2009).*
(Continued)

*Primary Examiner* — Nizar N Sivji
(74) *Attorney, Agent, or Firm* — ArentFox Schiff LLP; Michael Fainberg

(57) ABSTRACT

The present disclosure provides a queuing recommendation method and device, a terminal and a computer readable storage medium, and belongs to the technical field of image processing. The method includes: acquiring image information of all queuing objects, acquiring position information of each queuing object according to the image information, determining all effective queues according to the position information of the queuing objects, and determining tail position information of queues where the effective queues are located, wherein each effective queue includes at least one effective queuing object, and the tail position information of the queue including the fewest effective queuing objects is used as a recommendation result. According to the queuing recommendation method provided by the present (Continued)

disclosure, the accuracy of the recommendation result is improved, and time is saved.

10 Claims, 7 Drawing Sheets

(51) Int. Cl.
  *G06T 7/136* (2017.01)
  *G06V 10/44* (2022.01)
  *G06V 40/10* (2022.01)
(52) U.S. Cl.
  CPC .. *G06V 40/103* (2022.01); *G06T 2207/30196* (2013.01); *G06T 2207/30242* (2013.01); *G06V 2201/07* (2022.01)
(58) Field of Classification Search
  CPC ........... G06T 2207/30242; G06T 7/136; G06T 2207/10016; G06T 7/73; G06T 7/187; G06T 2207/30196; G07C 11/00
  See application file for complete search history.

(56) References Cited

U.S. PATENT DOCUMENTS

| | | | | |
|---|---|---|---|---|
| 2015/0127401 A1* | 5/2015 | Hogg | ................. | G06Q 30/0281 705/7.15 |
| 2015/0169954 A1* | 6/2015 | Schlattmann | ...... | G06K 9/00624 382/103 |
| 2015/0310624 A1* | 10/2015 | Bulan | ..................... | G06T 7/215 382/103 |
| 2016/0224845 A1* | 8/2016 | Gyger | ...................... | G06T 7/20 |
| 2017/0039431 A1* | 2/2017 | Yu | ...................... | G06K 9/00771 |
| 2019/0370976 A1* | 12/2019 | Oya | .......................... | G06T 7/70 |
| 2019/0392572 A1* | 12/2019 | Liu | .......................... | G06K 9/00 |

FOREIGN PATENT DOCUMENTS

| | | |
|---|---|---|
| CN | 105139040 A | 12/2015 |
| CN | 105303549 A | 2/2016 |
| CN | 106652147 A | 5/2017 |
| CN | 107153819 A * | 9/2017 |
| CN | 107153819 A | 9/2017 |
| CN | 107578521 A | 1/2018 |
| CN | 108460497 A | 8/2018 |
| CN | 108573189 A | 9/2018 |
| CN | 109840982 A | 6/2019 |
| EP | 2790140 A1 | 4/2014 |
| EP | 2991010 A1 | 3/2016 |
| GB | 2490660 A | 11/2012 |

OTHER PUBLICATIONS

Real-Time Queue Length Detection with Roadside LiDAR Data (Year: 2020).*
Design Parameters of Advanced Driver Information Systems: The Case of Incident Congestion and Small Market Penetratio (Year: 1991).*
Fairness-Driven Queue Management: A Survey and Taxonomy (Year: 2016).*
IP.com On Queuing, Marking, and Dropping (RFC7806) (Year: 2016).*
Office Action issued for corresponding application No. 201910000579.4 dated Jan. 20, 2020.

* cited by examiner

QUEUING RECOMMENDATION METHOD AND DEVICE, TERMINAL AND COMPUTER READABLE STORAGE MEDIUM

CROSS REFERENCE OF RELATED APPLICATIONS

The present application is a National Stage of International Application No. PCT/CN2019/126104, filed Dec. 17, 2019, which claims the priority of Chinese Patent Application No. 201910000579.4, filed to China Patent Office on Jan. 2, 2019 both of which are incorporated by reference herein in their entirety.

FIELD

The present disclosure relates to the field of image processing technologies, in particular to a queuing recommendation method and device, a terminal and a computer readable storage medium.

BACKGROUND

In supermarkets and other public environments, customers often need to queue up and wait when settling accounts, and since people are relatively concentrated, the queuing and waiting time of the customers may be prolonged when the number of the customers is large, so that the anxiety of the customers is caused. Meanwhile, when there are many queues, the customer often does not know how to find the queue with the fewest people and the position of the queue, so that shopping experience of the customer is greatly reduced. The problems also exist in public places such as hospitals and airports.

SUMMARY

In a first aspect, the present disclosure provides a queuing recommendation method applied to a queuing recommendation device and including:
acquiring image information of all queuing objects;
acquiring position information of each of the queuing objects according to the image information;
determining all effective queues according to the position information of the queuing objects, wherein each of effective queues includes at least one effective queuing object;
determining position information of a tail of each of the effective queues; and
taking position information of a tail of a queue including a least quantity of effective queuing objects among the effective queues as a recommendation result.

Optionally, the position information of the tail of each of the effective queues includes:
determining whether other queuing objects exist within an effective queuing distance threshold from a determined effective queuing object in the effective queue;
determining a queuing object with the shortest distance from the determined effective queuing object as a next effective queuing object in response to that the other queuing objects exist within the effective queuing distance threshold from the determined effective queuing object;
taking a direction of a connection line between the determined effective queuing object and the next effective queuing object as a predicted queue direction; and
determining the determined effective queuing object as a queuing object of a tail of the effective queue in response to that no other queuing object exists within the effective queuing distance threshold from the determined effective queuing object.

Optionally, the determining all the effective queues according to the position information of the queuing objects includes:
determining queuing objects side-by-side in the queues according to a side-by-side time threshold and a side-by-side distance threshold; and
determining the queuing objects side-by-side as one effective queuing object.

Optionally, the queuing recommendation method further includes:
determining whether a duration that the distance between different queuing objects in a perpendicular direction perpendicular to the predicted queue direction and in the effective queue is not more than the side-by-side distance threshold is not less than the side-by-side time threshold; and
determining the different queuing objects in the effective queues as the queuing objects side-by-side in response to that the duration is not less than the side-by-side time threshold.

Optionally, the operation of determining all the effective queues according to the position information of the queuing objects includes:
according to heights of the queuing objects, determining a queuing object of which a height is not greater than a height threshold and another queuing object of which a height is greater than the height threshold in the effective queue as one effective queuing object, wherein the another queuing object is an object with the shortest distance from the queuing object of which the height is not greater than the height threshold.

Optionally, the queuing recommendation method also includes:
determining whether a queuing object in the effective queue belongs to another queue;
determining whether other queuing objects exist near the queuing object and on the perpendicular direction of the predicted queue direction in response to that the queuing object in the effective queue belongs to the another queue; and
removing the queuing objects side-by-side in response to that the queuing objects exist in both directions of the perpendicular direction.

In a second aspect, the present disclosure provides a queuing recommendation device, including:
an image information acquisition module, configured to acquire image information of all queuing objects;
a position information acquisition module, configured to acquire position information of each of the queuing objects according to the image information;
an effective queue determination module, configured to determine all effective queues according to the position information of the queuing objects, wherein each of the effective queues comprises at least one effective queuing object; and
a recommendation result generation module, configured to determine position information of a tail of each of the effective queues, and take position information of a tail of a queue comprising a least quantity of effective queuing objects among the effective queues as a recommendation result.

Optionally, the recommendation result generation module includes:

a first judgment module, configured to determine whether other queuing objects exist within an effective queuing distance threshold from a determined effective queuing object in the effective queue;

a first determination module, configured to determine a queuing object with the shortest distance from the determined effective queuing object as a next effective queuing object in response to that the other queuing objects exist within the effective queuing distance threshold from the determined effective queuing object in the effective queue, and take a direction of a connection line between the determined effective queuing object and the next effective queuing object as a predicted queue direction; and a second determination module, configured to determine the determined effective queuing object as a queuing object of a tail of the effective queue in response to that no other queuing object exists within an effective queuing distance threshold from a determined effective queuing object in an effective queue.

Optionally, the effective queue determination module also includes:

a third determination module, configured to determine queuing objects side-by-side in the queue according to a side-by-side time threshold and a side-by-side distance threshold, and determine the queuing objects side-by-side as one effective queuing object.

Optionally, the third determination module includes:

a second judgment module, configured to determine whether a duration that a distance between different queuing objects in a perpendicular direction perpendicular to the predicted queue direction and in the effective queue is not more than the side-by-side distance threshold is not less than the side-by-side time threshold; and a fourth determination module, configured to determine the different queuing objects in the effective queue as the queuing objects side-by-side in response to that the duration is not less than the side-by-side time threshold.

Optionally, the effective queue determination module also includes:

a fifth determination module, configured to determine a queuing object of which a height is not greater than a height threshold and another queuing object of which a height is greater than the height threshold in the effective queue as one effective queuing object, wherein the another queuing object is an object with the shortest distance from the queuing object of which the height is not greater than the height threshold.

Optionally, the effective queue determination module also includes:

a third judgment module, configured to determine whether a queuing object in the effective queue belongs to another queue; and a sixth determination module, configured to determine determining whether other queuing objects exist near the queuing object and on the perpendicular direction perpendicular to the predicted queue direction in response to that the queuing object in the effective queue belongs to the another queue, and remove queuing objects side-by-side in response to that the queuing objects exist in both directions of the perpendicular direction.

In a third aspect, the present disclosure provides a queuing recommendation device, including a memory and a processor, wherein the memory stores computer executable instructions; and the processor is configured to execute the executable instructions to perform any queuing recommendation method as described in the first aspect.

In a fourth aspect, the present disclosure provides a computer readable storage medium storing computer executable instructions which are executed by a processor to perform any queuing recommendation method as described in the first aspect.

DETAILED DESCRIPTION OF THE EMBODIMENTS

In supermarkets and other public environments, customers often need to queue up and wait when settling accounts, and since people are relatively concentrated, the queuing and waiting time of the customers may be prolonged when the number of the customers is large, so that the anxiety of the customers is caused. Meanwhile, when there are many queues, the customer often does not know how to find the queue with the fewest people and the position of the queue, so that shopping experience of the customer is greatly reduced. The problems also exist in public places such as hospitals and airports.

A related solution is to reduce the queuing and waiting time of the customers through manual guidance of workers in the supermarkets or by providing self-service checkout devices. As manual guidance completely depends on control of the workers over site situations, and is wasting in time and labor and quite low in efficiency. Meanwhile, use experience of the self-service checkout devices cannot meet all requirements of the customers.

Therefore, how to better serve the customers, reduce the queuing and waiting time of the customers, improve the working efficiency of the supermarkets and reduce the expenditure of human resources has become one of problems urgently to be solved by those skilled in the art.

Aiming at solving the problem of low reliability of queuing recommendation in related technologies, embodiments of the present disclosure provide a queuing recommendation method and device, a terminal and a computer readable storage medium. In order to make objects, technical solutions, and advantages of the present disclosure clearer, the queuing recommendation method and device, terminal and computer readable storage medium provided by the embodiments of the present disclosure will be described in detail in combination with the accompanying drawings. It should be understood that the preferred embodiments described below serve merely to illustrate and explain the present disclosure and are not intended to limit the present disclosure. And in the case of no conflict, the embodiments in the present application and characteristics in the embodiments can be combined with each other.

Figure 1:
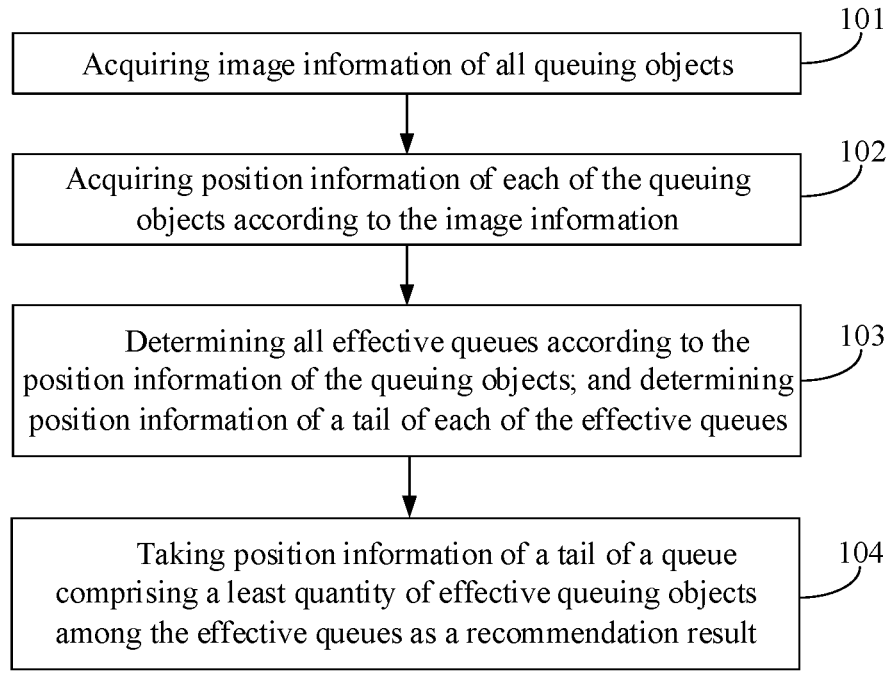
FIG. 1 is a flow diagram of a queuing recommendation method provided by an embodiment of the present disclosure.

FIG. 1 is a flow diagram of a queuing recommendation method provided by an embodiment of the present disclosure, applied to a queuing recommendation device, and as shown in FIG. 1, the method includes the following steps.

Step 101, acquiring image information of all queuing objects.

Optionally, camera equipment can transmit collected queuing RGB image data (color image data) to the queuing recommendation device. In the embodiments of the present disclosure, when the queuing recommendation device is an integrated circuit, the camera equipment can transmit image data of collected initial head images to a field-programmable gate array (FPGA) chip.

An object detection model based on deep learning, such as a single shot multibox detector (SSD) object detection algorithm, is used for identifying queuing objects in the images. A fine adjustment part of the model changes places related to classes parameters in a network structure to 2, namely the two-class of human heads or backgrounds. Training data of the model is from as follows: a large quantity of surveillance video images are collected in advance, and then human head positions in the images are marked, that is, a large number of picture data marked with human body location boxes are obtained to serve as training data of the model. Analysis is carried out according to the human head detection training model to obtain the queuing objects in the image information.

Step 102, acquiring position information of each queuing object according to the image information.

Optionally, a pixel coordinate of a certain point in the image is set to be $(u_i, v_i)$ camera depth data $Z_i$ corresponding to the pixel coordinate of the point is obtained by solving binocular camera parallax, and then a three-dimensional coordinate $P_{ic}$ $(X_{ic}, Y_{ic}, Z_{ic})$ of the point in a camera coordinate system is acquired according to a pinhole camera model:

$$Z_i \begin{pmatrix} u_i \\ v_i \\ 1 \end{pmatrix} = \begin{pmatrix} f_x & 0 & c_x \\ 0 & f_y & c_y \\ 0 & 0 & 1 \end{pmatrix} \begin{pmatrix} X_{ic} \\ Y_{ic} \\ Z_{ic} \end{pmatrix}.$$

Wherein $f_x$, $f_y$, which are generally equal to each other, are parameters representing a focal length; $c_x$, $c_y$ are a coordinate of a main point (with respect to an imaging plane); and a rotation matrix R and a translation matrix t of a camera with respect to a world coordinate system can be obtained according to external parameters of the camera so that a coordinate $P_{iw}$ $(X_{iw}, Y_{iw}, Z_{iw})$ in the world coordinate system corresponding to a three-dimensional coordinate $(X_i, Y_i, Z_i)$ of the camera coordinate system can be obtained by $P_{ic} = RP_{iw} + t$.

Therefore, a spatial coordinate of the point under the world coordinate system is obtained through the pixel coordinate in the image. A pixel coordinate of a center point of each human head object contour is determined according to the image information of the queuing object, and then a coordinate of each center point under the world coordinate system is solved through a coordinate conversion relation.

In scenes such as the supermarkets, contour positions pre-marked, namely obstacle positions in an environment near a queuing channel, of fixed equipment including a cashier window in the environment are obtained. Moreover, a position of a passable channel area can be calculated and stored by using a raster method path planning algorithm, and channel data are used for predicting a queue.

Step 103, determining all effective queues according to the position information of the queuing objects, and determining position information of a tail of each effective queue, wherein each effective queue includes at least one effective queuing object.

Figure 2:
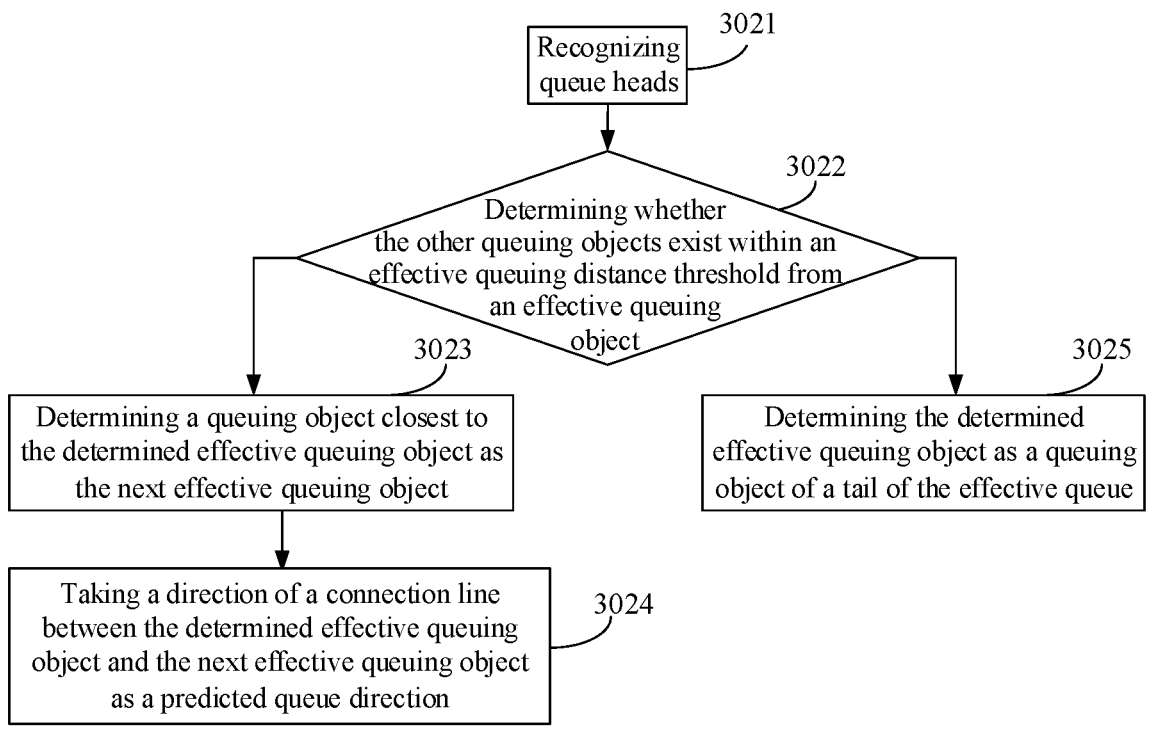
FIG. 2 is a flow diagram of an effective queue determination method provided by an embodiment of the present disclosure.

Optionally, an implementation process of the step 103, as shown in FIG. 2, includes the following steps.

Step 3021, recognizing queue heads.

Exemplarily, in the scenes such as supermarkets, a mark point $(u_{oi}, v_{oi})$, wherein i=1, 2, 3 . . . , is set at a passable center position of a side of each cashier desk firstly, for determining the head of the corresponding queue. According to the preset mark point $(u_{oi}, v_{oi})$ beside the cashier desk, a world coordinate corresponding to the point is solved, and then a head object $X_1$ which is with the shortest distance from the point and falls within a range of ±90° from an $X_w$ axis direction with $X_0$ as a center is found to serve as a position of a head the queue. A circle is made by taking $X_1$ as a center and taking a set distance threshold d as a radius; and if no intersection point exists between the circle and pre-marked obstacle contour, it is considered that the surrounding is empty, and the $X_w$ axis direction is used as a predicted ideal queuing direction.

Step 3022, determining whether the other queuing objects exist within an effective queuing distance threshold from an effective queuing object.

Figure 3:
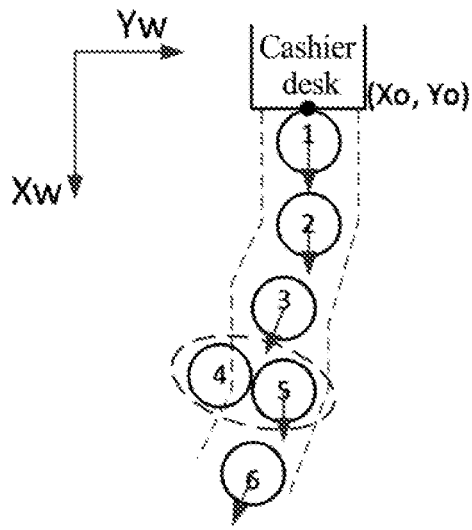
FIG. 3 is a schematic diagram of queuing provided by an embodiment of the present disclosure.

Exemplarily, a position and a direction of the next person is predicted through the position of the head of the queue to recognize the sharp of the queue. As shown in FIG. 3, by taking the position of the head of the queue as the first determined effective queuing object of the effective queue, whether there are other subsequent queuing objects is determined according to step 3022. Specifically, a circle is made by taking the position of the head of the queue $X_1$ as a center and a set distance threshold d as a radius, to determine whether the queuing object exists within the distance threshold.

Step 3023, determining a queuing object with the shortest distance from the determined effective queuing object as the next effective queuing object, when it is determined that the other queuing objects exist within the effective queuing distance threshold from the determined effective queuing object.

Exemplarily, as shown in FIG. 3, the objects within a range of ±θ in the $X_w$ axis direction at the position of the head of the queue by taking $X_1$ as the center and the distance threshold d as the radius are found, and the queuing object $X_2$ with the shortest distance from $X_1$ is determined and used as the next effective queuing object of the queue.

Step 3024, taking a direction of a connection line between the determined effective queuing object and the next effective queuing object as a predicted queue direction.

Exemplarily, as shown in FIG. 3, the direction of the connection line between $X_1$ and $X_2$ is determined as the predicted queue direction.

Step 3025, determining the determined effective queuing object as a queuing object of a tail of the effective queue, when it is determined that no other queuing object exists within the effective queuing distance threshold from the determined effective queuing object.

Exemplarily, a circle is made by taking $X_1$ as a center and a set distance threshold d as a radius; and if no queuing object exists, it is considered that the surrounding is empty, and the $X_1$ is the queuing object of the tail.

Figure 4:
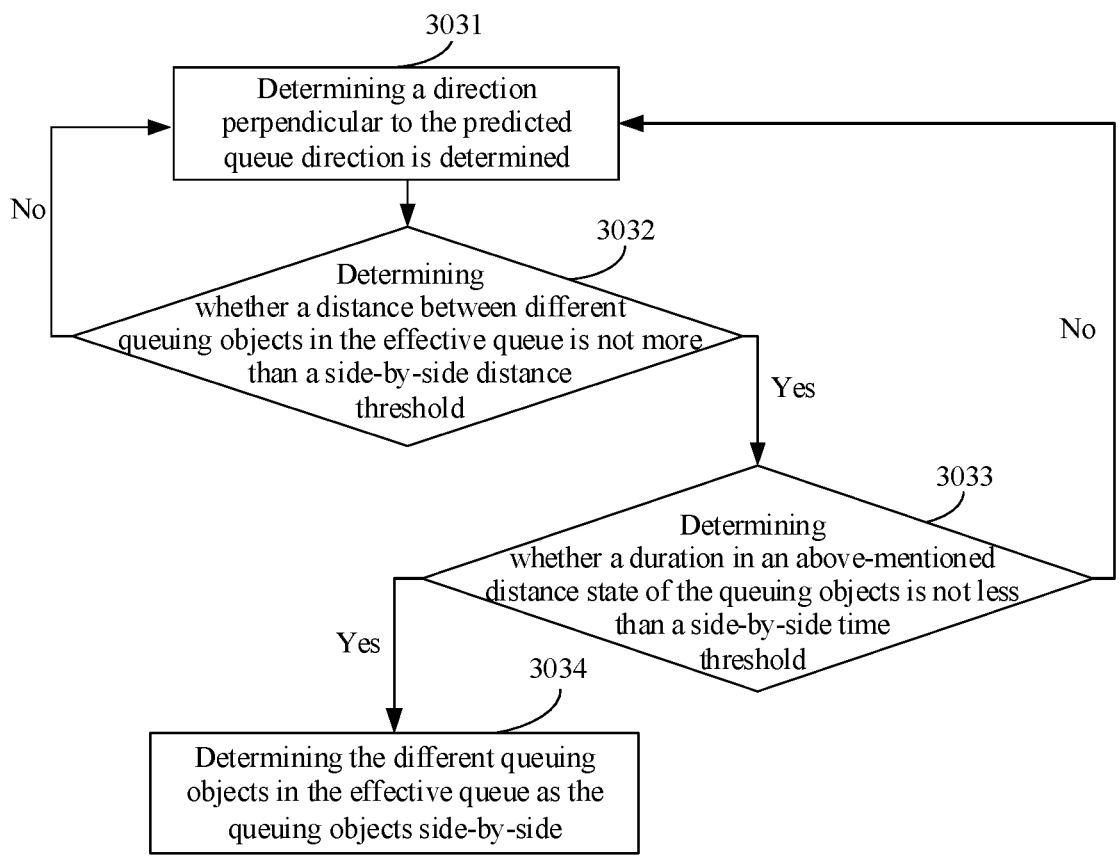
FIG. 4 is a flow diagram of a side-by-side queuing object determination method provided by an embodiment of the present disclosure.

Optionally, the implementation process of the step 103, as shown in FIG. 4, can also include the following steps.

Step 3031, determining a perpendicular direction perpendicular to the predicted queue direction.

Exemplarily, a direction perpendicular to the predicted direction is determined according to the predicted queue direction, and is determined as a direction of queuing objects side-by-side.

Step 3032, determining whether a distance between different queuing objects in the effective queue is not more than a side-by-side distance threshold.

Exemplarily, whether two or more queuing objects are in the effective queue in the direction perpendicular to the predicted direction is determined, and if so, whether the distance between the different queuing objects is not more than the side-by-side distance threshold is determined, wherein the side-by-side distance threshold may be a shoulder width.

Step 3033, if the distance between at least two queuing objects in the effective queue is not more than the side-by-side distance threshold, determining whether a duration in an above-mentioned distance state (i.e., a distance between different queuing objects in the effective queue is not more than a side-by-side distance threshold) of the queuing objects is not less than a side-by-side time threshold, wherein the side-by-side time threshold can be defined as the shortest time when the queuing objects are queuing together as a family group.

Step 3034, if the duration is not less than the side-by-side time threshold, determining the different queuing objects in the effective queue as the queuing objects side-by-side. Moreover, when calculating the number of the effective queuing objects of the queue, the queuing objects side-by-side are marked as one effective queuing object.

Figure 5:
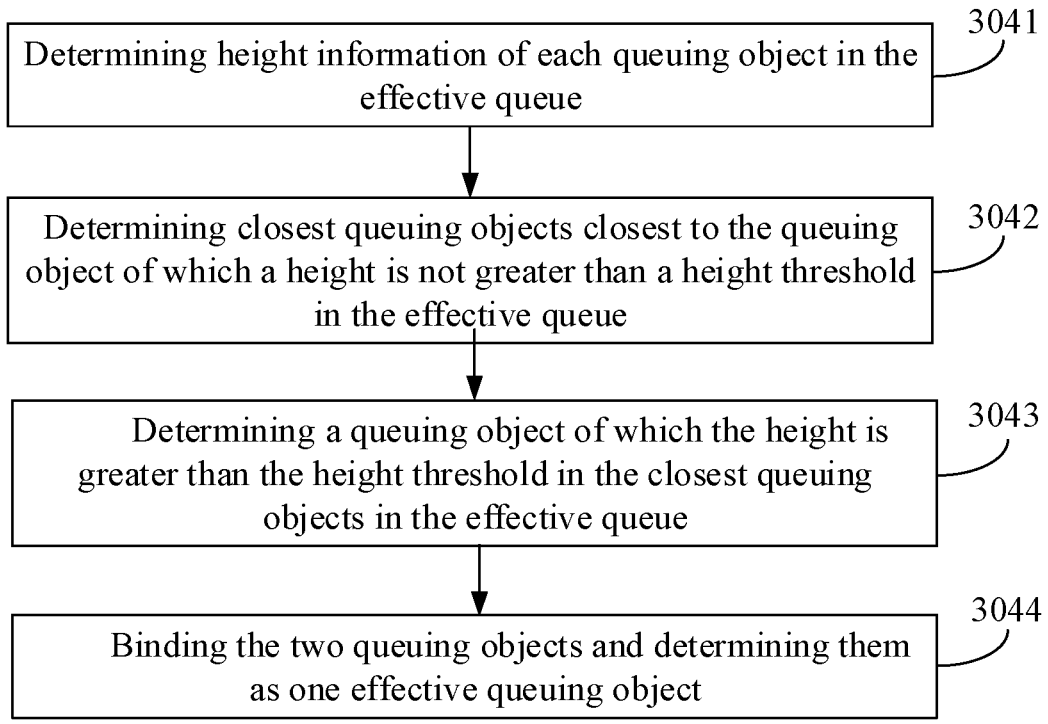
FIG. 5 is a schematic diagram of an effective queue determination method provided by an embodiment of the present disclosure.

Optionally, the implementation process of the step 103, as shown in FIG. 5, can also include the following steps.

Step 3041, determining height information of each queuing object in the effective queue.

Exemplarily, the height information of the queuing object is determined according to information in the world coordinate system and a structure after the object is recognized, and the object is an adult or a child is determined according to the height information.

Step 3042, determining closest queuing objects with the shortest distance from the queuing object of which a height is not greater than a height threshold in the effective queue.

Exemplarily, the height threshold can be set to 1.4 m. The queuing object of which actual height value is less than the height threshold is determined. Find one or more queuing objects, which are with the shortest distance from this queuing object, in the effective queue by taking this queuing object as a center.

Step 3043, determining a queuing object of which the height is greater than the height threshold in the queuing objects with the shortest distance from this queuing object in the effective queue.

Exemplarily, whether the height of the closest queuing object is more than the height threshold is determined. If the height is more than the height threshold, the two queuing objects are bound. If the height is less than the height threshold, continuously find the queuing object of which the height is more than the height threshold according to the distance.

Step 3044, binding the two queuing objects and determining them as one effective queuing object.

Exemplarily, the two bound queuing objects are determined as one effective queuing object. That is, when the number of the effective queuing objects of the queue is calculated, the two bound queuing objects are marked as one effective queuing object.

Figure 6:
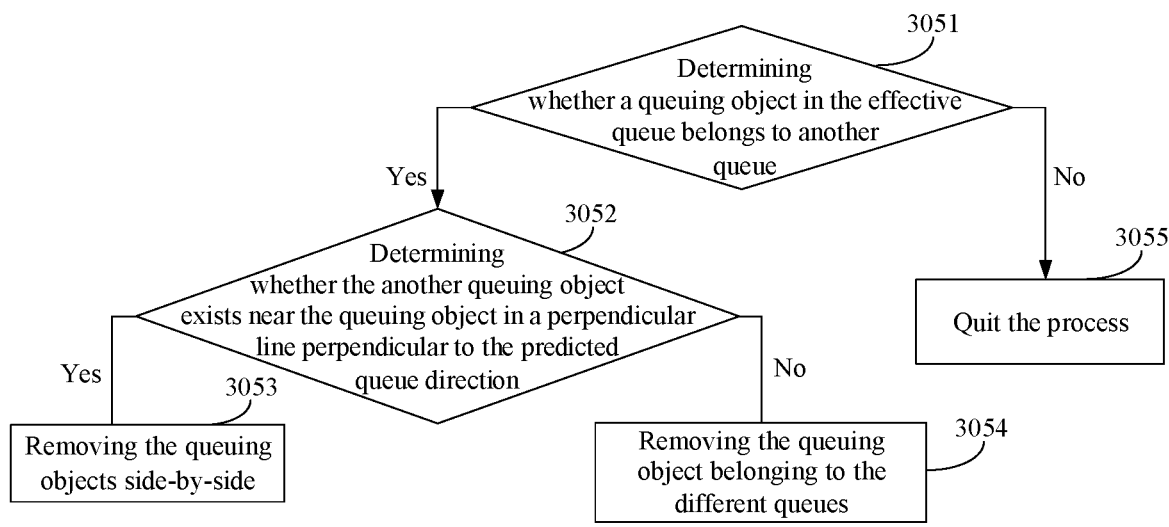
FIG. 6 is a schematic diagram of another effective queue determination method provided by an embodiment of the present disclosure.

Optionally, the implementation process of the step 103, as shown in FIG. 6, also includes the following steps.

Step 3051, determining whether a queuing object in the effective queue belongs to another queue.

Exemplarily, after queuing situations of all the queues are determined, whether the one same queuing object exists in the different queues is determined according to the position information of the queuing object.

Step 3052, determining whether the another queuing object exists near the queuing object in a perpendicular direction perpendicular to the predicted queue direction, when it is determined that the queuing object in the effective queue belongs to the different queues.

Exemplarily, if the one same queuing object exists in the different queues, firstly the perpendicular direction perpendicular to the predicted queue direction is determined, and if there are many queues, the predicted direction can be the predicted direction of any queue; and then whether the another queuing objects exist in the perpendicular direction is determined, wherein the queuing objects include all initial queuing objects.

Step 3053, removing the queuing objects side-by-side, when it is determined that the queuing objects exist in both directions of perpendicular direction.

Exemplarily, the two directions of the perpendicular direction are determined, and the two directions mentioned here may refer to two directions between which an included angle is 180 degrees. Whether the other queuing objects exist in both the two directions of the queuing objects belonging to the different queues is determined, and if so, the side-by-side queuing objects are removed.

Step 3054, removing the queuing object belonging to the different queues, when it is determined that the queuing objects do not exist in both the two directions of the perpendicular direction.

Exemplarily, whether the other queuing objects exist in both the two directions of the queuing objects belonging to the different queues is determined, and if no, the queuing objects belonging to the different queues are removed.

Step 3055, quitting the process, when it is determined that the same one queuing object belongs to the same queue.

Step 104, taking position information of a tail of a queue including the least quantity of effective queuing objects among the effective queues as a recommendation result.

Exemplarily, the quantity of the effective queuing objects included in each effective queue is calculated, the quantities of the effective queuing objects of all the queues are compared, the queue including the least quantity of effective queuing objects is determined, and the position information of the tail of the queue is used as the recommendation result, wherein a position of a tail refers to position information of the last effective queuing object of the queue in the world coordinate system.

Figure 7:
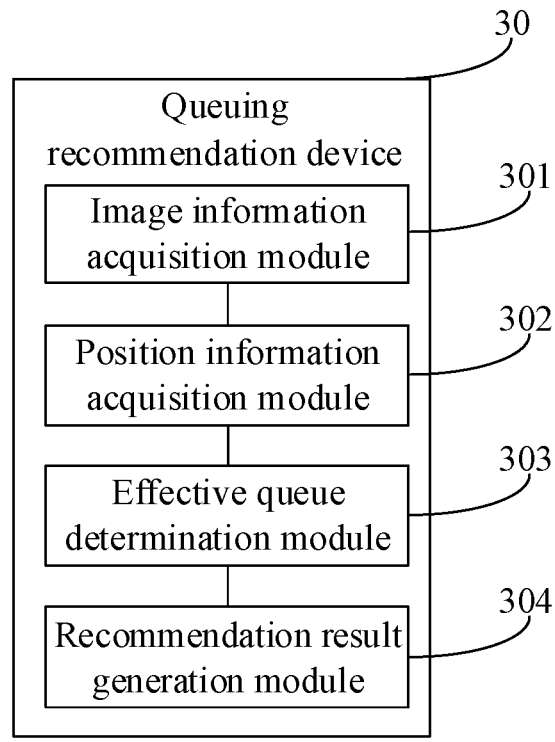
FIG. 7 is a schematic diagram of a queuing recommendation device provided by an embodiment of the present disclosure.

FIG. 7 is a schematic diagram of a structure of a queuing recommendation device provided by an embodiment of the present disclosure; and as shown in FIG. 7, the device 30 includes:

an image information acquisition module 301, configured to acquire image information of all queuing objects;

a position information acquisition module 302, configured to acquire position information of each of the queuing objects according to the image information;

an effective queue determination module 303, configured to determine all effective queues according to the position information of the queuing objects, wherein each of the effective queues comprises at least one effective queuing object; and a recommendation result generation module 304, configured to determine position information of a tail of each of the effective queues, and take position information of a tail of a queue comprising a least quantity of effective queuing objects among the effective queues as a recommendation result.

Figure 8:
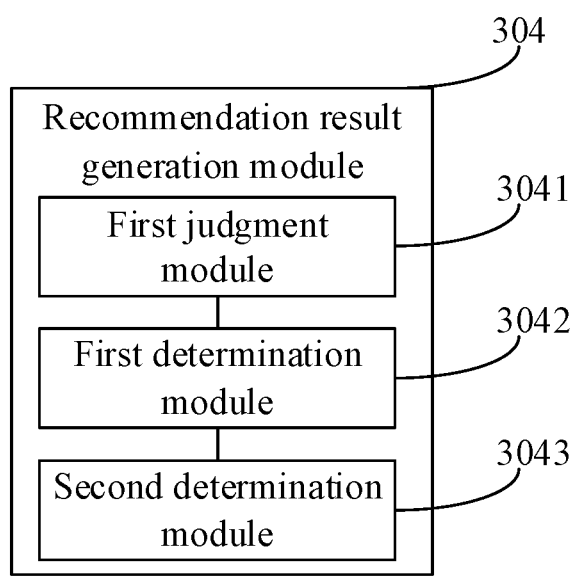
FIG. 8 is a schematic diagram of a structure of a recommendation result generation module provided by an embodiment of the present disclosure.

Optionally, as shown in FIG. 8, the recommendation result generation module 304 includes:

a first judgment module 3041, configured to determine whether other queuing objects exist within an effective queuing distance threshold from a determined effective queuing object in the effective queue;

a first determination module 3042, configured to determine a queuing object with the shortest distance the determined effective queuing object as a next effective queuing object in response to that the other queuing objects exist within the effective queuing distance threshold from the determined effective queuing object in the effective queue, and take a direction of a connection line between the determined effective queuing object and the next effective queuing object as a predicted queue direction; and a second determination module 3043, configured to determine the determined effective queuing object as a queuing object of a tail of the effective queue in response to that no other queuing object exists within an effective queuing distance threshold from a determined effective queuing object in an effective queue.

Figure 9:
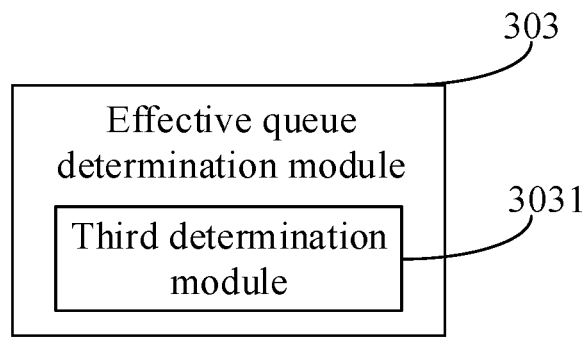
FIG. 9 is a schematic diagram of a structure of another effective queue determination module provided by an embodiment of the present disclosure.

Optionally, as shown in FIG. 9, the effective queue determination module 303 includes:

a third determination module 3031, configured to determine queuing objects side-by-side in the queue according to a side-by-side time threshold and a side-by-side distance threshold, and determine the queuing objects side-by-side as one effective queuing object.

Figure 10:
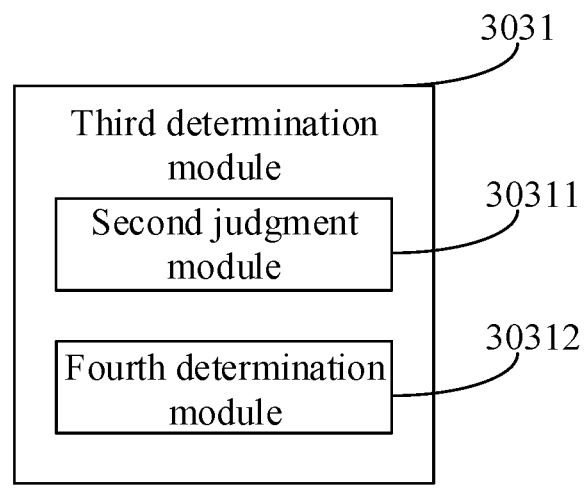
FIG. 10 is a schematic diagram of a structure of a third determination module provided by an embodiment of the present disclosure.

Optionally, as shown in FIG. 10, the third determination module 3031 includes:

a second judgment module 30311, configured to determine whether a duration that a distance between different queuing objects in a perpendicular direction perpendicular to the predicted queue direction and in the effective queue is not more than the side-by-side distance threshold is not less than the side-by-side time threshold; and a fourth determination module 30312, configured to determine the different queuing objects in the effective queue as the queuing objects side-by-side in response to that the duration is not less than the side-by-side time threshold.

Figure 11:
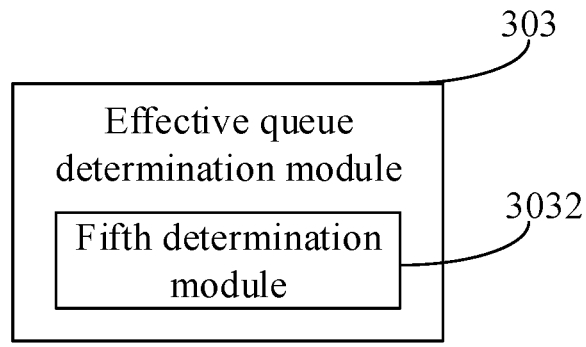
FIG. 11 is a schematic diagram of a structure of another effective queue determination module provided by an embodiment of the present disclosure.

Optionally, as shown in FIG. 11, the effective queue determination module 303 includes:

a fifth determination module 3032, configured to determine a queuing object of which a height is not greater than a height threshold and another queuing object of which a height is greater than the height threshold in the effective queue as one effective queuing object, wherein the another queuing object is an object with the shortest distance the queuing object of which the height is not greater than the height threshold.

Figure 12:
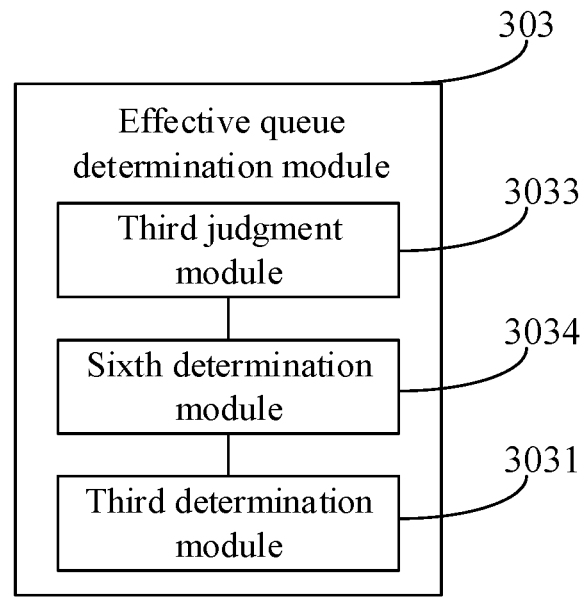
FIG. 12 is a schematic diagram of a structure of another effective queue determination module provided by an embodiment of the present disclosure.

Optionally, as shown in FIG. 12, the effective queue determination module 303 also includes:

a third judgment module 3033, configured to determine whether a queuing object in the effective queue belongs to another queue; and a sixth determination module 3034, configured to determine determining whether other queuing objects exist near the queuing object and on the perpendicular direction perpendicular to the predicted queue direction in response to that the queuing object in the effective queue belongs to the another queue, and remove queuing objects side-by-side in response to that the queuing objects exist in both directions of the perpendicular direction.

With respect to the device in the above-mentioned embodiments, specific modes of operating execution of the various modules have been described in detail in the embodiments relating to the method, and will not be set forth in detail herein. Moreover, the modules of the device mentioned in the embodiments can be realized on hardware, for example, a function of equipment can be realized through the hardware or by executing corresponding software through the hardware. The hardware or software includes one or more modules corresponding to the above-mentioned functions.

Moreover, division of the units in the embodiments of the present application is schematic, and is only a kind of logic function division, and another division mode can be adopted during actual implementation. Each functional unit in the embodiments of the present application can be integrated in a processing unit, or each unit can exist independently and physically, or two or more units can be integrated in one unit. The integrated unit can be realized in a form of hardware, and can also be realized in a form of a software functional unit.

An embodiment of the present disclosure provides a queuing recommendation device, including a memory and a processor, wherein the memory is configured to store computer programs; and the processor is configured to execute the executable instructions to perform the queuing recommendation method as described in the method embodiments.

Figure 13:
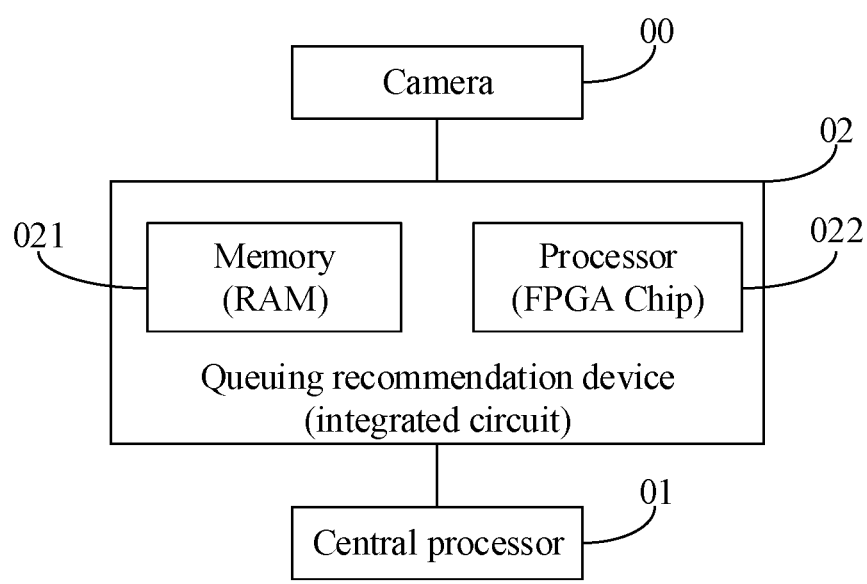
FIG. 13 is a schematic diagram of a structure of a terminal provided by an embodiment of the present disclosure.

FIG. 13 is a schematic diagram of a structure of a terminal provided by an embodiment of the present disclosure, as shown in FIG. 13, the terminal includes camera 00, a central processor 01 and a queuing recommendation device 02, wherein the queuing recommendation device is an integrated circuit and includes a memory 021 and a processor 022, the processor is an field-programmable gate array (FPGA) chip, the memory may be a Random Access Memory (RAM), and the FPGA chip is capable of executing computer programs to implement the queuing recommendation method as described in the method embodiments.

The camera equipment 00 is configured to collect initial queuing images; and the queuing recommendation device 02 is configured to perform queuing recommendation analysis on the initial queuing images, and transmit recommendation result data acquired to the central processor 01 after queuing recommendation analysis, wherein the recommendation result data may be position information or queuing recommendation according to the position information.

Optionally, the terminal may be smart home equipment, mobile communication equipment or equipment in other fields, and a type of the terminal is not limited in the embodiments of the present disclosure.

The present disclosure provides a computer readable storage medium storing computer executable instructions which are executed by a processor to perform the queuing recommendation method as described in the method embodiments.

Those of ordinary skill in the art should appreciate that all or part of the steps of implementing the above-mentioned embodiments may be accomplished by hardware, or by instructing the associated hardware through the programs which may be stored in the computer readable storage medium, and the above-mentioned storage medium may be a read-only memory, a magnetic disk, an optical disk, or the like.

The above is merely optional embodiments of the present disclosure and is not intended to limit the present disclosure, and any modifications, equivalents, improvements, etc. made within the spirit and principles of the present disclosure should be included within the protection scope of the present disclosure.

What is claimed is:

1. A queuing recommendation method, comprising:
    acquiring, by a queuing recommendation device, image information of all queuing objects from a camera;
    acquiring, by the queuing recommendation device, position information of each of the queuing objects according to the image information;
    determining, by the queuing recommendation device, all effective queues according to the position information of the queuing objects, wherein each of the effective queues comprises at least one effective queuing object;
    determining, by the queuing recommendation device, position information of a tail of each of the effective queues; and
    taking, by the queuing recommendation device, position information of a tail of a queue comprising a least quantity of effective queuing objects among the effective queues as a recommendation result;
wherein the determining, by the queuing recommendation device, the position information of the tail of each of the effective queues comprises:
    determining, by the queuing recommendation device, whether other queuing objects exist within an effective queuing distance threshold from a determined effective queuing object in the effective queue;
    determining, by the queuing recommendation device, a queuing object with a shortest distance the determined effective queuing object as a next effective queuing object in response to that the other queuing objects exist within the effective queuing distance threshold from the determined effective queuing object in the effective queue;
    taking, by the queuing recommendation device, a direction of a connection line between the determined effective queuing object and the next effective queuing object as a predicted queue direction; and
    determining, by the queuing recommendation device, the determined effective queuing object as a queuing object of a tail of the effective queue in response to that no other queuing object exists within an effective queuing distance threshold from a determined effective queuing object in an effective queue;
wherein the determining, by the queuing recommendation device, all the effective queues according to the position information of the queuing objects comprises:
    determining, by the queuing recommendation device, queuing objects in the effective queue of which respective heights are not greater than a height threshold and other queuing objects in the effective queue of which respective heights are greater than the height threshold;
    determining, by the queuing recommendation device, a queuing object in the queuing objects and a queuing object in the other queuing objects with a shortest distance from the queuing object in the queuing objects as one effective queuing object.

2. The queuing recommendation method according to claim 1, wherein the determining, by the queuing recommendation device, all the effective queues according to the position information of the queuing objects comprises:
    determining, by the queuing recommendation device, queuing objects side-by-side in the queue according to a side-by-side time threshold and a side-by-side distance threshold; and
    determining, by the queuing recommendation device, the queuing objects side-by-side as one effective queuing object.

3. The queuing recommendation method according to claim 2, further comprising:
    determining, by the queuing recommendation device, whether a duration that a distance between different queuing objects in a perpendicular direction perpendicular to the predicted queue direction and in the effective queue is not more than the side-by-side distance threshold is not less than the side-by-side time threshold; and
    determining, by the queuing recommendation device, the different queuing objects in the effective queue as the queuing objects side-by-side in response to that the duration is not less than the side-by-side time threshold.

4. The queuing recommendation method according to claim 3, further comprising:
    determining, by the queuing recommendation device, whether a queuing object in the effective queue belongs to another queue;
    determining, by the queuing recommendation device, whether other queuing objects exist near the queuing object and on the perpendicular direction perpendicular to the predicted queue direction in response to that the queuing object in the effective queue belongs to the another queue; and
    removing, by the queuing recommendation device, queuing objects side-by-side in response to that the queuing objects exist in the perpendicular direction.

5. A queuing recommendation device, comprising at least one memory and at least one processor, wherein the memory stores computer executable instructions, and the processor is configured to execute the executable instructions to:

cause the queuing recommendation device to acquire image information of all queuing objects from a camera;

cause the queuing recommendation device to acquire position information of each of the queuing objects according to the image information;

cause the queuing recommendation device to determine all effective queues according to the position information of the queuing objects, wherein each of the effective queues comprises at least one effective queuing object;

cause the queuing recommendation device to determine position information of a tail of each of the effective queues; and cause the queuing recommendation device to take position information of a tail of a queue comprising a least quantity of effective queuing objects among the effective queues as a recommendation result;

cause the queuing recommendation device to determine whether other queuing objects exist within an effective queuing distance threshold from a determined effective queuing object in the effective queue;

cause the queuing recommendation device to determine a queuing object with a shortest distance the determined effective queuing object as a next effective queuing object in response to that the other queuing objects exist within the effective queuing distance threshold from the determined effective queuing object in the effective queue;

cause the queuing recommendation device to take a direction of a connection line between the determined effective queuing object and the next effective queuing object as a predicted queue direction; and cause the queuing recommendation device to determine the determined effective queuing object as a queuing object of a tail of the effective queue in response to that no other queuing object exists within an effective queuing distance threshold from a determined effective queuing object in an effective queue;

cause the queuing recommendation device to determine queuing objects in the effective queue of which respective heights are not greater than a height threshold and other queuing objects in the effective queue of which respective heights are greater than the height threshold;

cause the queuing recommendation device to determine a queuing object in the queuing objects and a queuing object in the other queuing objects with a shortest distance from the queuing object in the queuing objects as one effective queuing object.

6. A terminal, comprising a camera, a central processor and the queuing recommendation device according to claim 5, wherein the queuing recommendation device is an integrated circuit, and the processor is a field-programmable gate array (FPGA) chip;

the camera is configured to collect images of queuing objects;

and the queuing recommendation device is configured to perform queuing recommendation analysis on the images of the queuing objects, and transmit queuing recommendation data acquired to the central processor after queuing recommendation analysis.

7. The queuing recommendation device according to claim 5, wherein the processor is further configured to:

determine queuing objects side-by-side in the queue according to a side-by-side time threshold and a side-by-side distance threshold; and determine the queuing objects side-by-side as one effective queuing object.

8. The queuing recommendation device according to claim 7, wherein the processor is further configured to:

determine whether a duration that a distance between different queuing objects in a perpendicular direction perpendicular to the predicted queue direction and in the effective queue is not more than the side-by-side distance threshold is not less than the side-by-side time threshold; and determine the different queuing objects in the effective queue as the queuing objects side-by-side in response to that the duration is not less than the side-by-side time threshold.

9. The queuing recommendation devicemethod according to claim 8, wherein the processor is further configured to:

determine whether a queuing object in the effective queue belongs to another queue;

determine whether other queuing objects exist near the queuing object and on the perpendicular direction perpendicular to the predicted queue direction in response to that the queuing object in the effective queue belongs to the another queue; and remove queuing objects side-by-side in response to that the queuing objects exist in the perpendicular direction.

10. A non-transitory computer readable medium, storing computer executable instructions which are executed by a processor to perform the queuing recommendation method according to claim 1.

* * * * *